United States Patent
Matsumoto et al.

(10) Patent No.: US 11,089,600 B2
(45) Date of Patent: Aug. 10, 2021

(54) BASE STATION AND RADIO TERMINAL

(71) Applicant: KYOCERA CORPORATION, Kyoto (JP)

(72) Inventors: Naohisa Matsumoto, Higashiomi (JP); Hiroyuki Urabayashi, Yokohama (JP); Kugo Morita, Yokohama (JP); Masato Fujishiro, Yokohama (JP); Hiroyuki Adachi, Kawasaki (JP); Chiharu Yamazaki, Tokyo (JP); Fangwei Tong, Machida (JP)

(73) Assignee: KYOCERA Corporation, Kyoto (JP)

( * ) Notice: Subject to any disclaimer, the term of this patent is extended or adjusted under 35 U.S.C. 154(b) by 119 days.

(21) Appl. No.: 15/751,713

(22) PCT Filed: Aug. 8, 2016

(86) PCT No.: PCT/JP2016/073293
§ 371 (c)(1),
(2) Date: Feb. 9, 2018

(87) PCT Pub. No.: WO2017/026440
PCT Pub. Date: Feb. 16, 2017

(65) Prior Publication Data
US 2018/0234983 A1    Aug. 16, 2018

(30) Foreign Application Priority Data
Aug. 11, 2015    (JP) .............................. JP2015-159044

(51) Int. Cl.
*H04W 76/00*    (2018.01)
*H04W 16/14*    (2009.01)
(Continued)

(52) U.S. Cl.
CPC ......... *H04W 72/082* (2013.01); *H04W 16/14* (2013.01); *H04W 48/20* (2013.01);
(Continued)

(58) Field of Classification Search
CPC ... H04W 72/082; H04W 16/14; H04W 76/28; H04W 48/20; H04W 72/0453;
(Continued)

(56) References Cited

U.S. PATENT DOCUMENTS

2009/0161619 A1* 6/2009 Noma ................. H04W 72/082
                                                                370/329
2012/0230299 A1* 9/2012 Shu ....................... H04W 24/02
                                                                370/331
(Continued)

FOREIGN PATENT DOCUMENTS

| JP | 2015-019419 A | 1/2015 |
| JP | 2015-115667 A | 6/2015 |
| WO | 2015/012208 A1 | 1/2015 |

OTHER PUBLICATIONS

International Search Report issued in PCT/JP2016/073293; dated Oct. 25, 2016.
(Continued)

*Primary Examiner* — Rebecca E Song
*Assistant Examiner* — Vanneilian Lalchinthang
(74) *Attorney, Agent, or Firm* — Studebaker & Brackett PC

(57) ABSTRACT

A base station (200) according to one embodiment uses a specific frequency band shared by a plurality of operators and/or a plurality of communication systems. The base transmit, to a radio terminal (100-1), interference-related information relating to interference detected by the base station in the specific frequency band.

7 Claims, 7 Drawing Sheets

(51) Int. Cl.
  *H04W 52/24* (2009.01)
  *H04W 72/08* (2009.01)
  *H04W 48/20* (2009.01)
  *H04W 72/04* (2009.01)
  *H04W 48/10* (2009.01)
  *H04W 74/00* (2009.01)

(52) U.S. Cl.
  CPC ........ *H04W 72/0453* (2013.01); *H04W 48/10* (2013.01); *H04W 74/006* (2013.01)

(58) Field of Classification Search
  CPC . H04W 74/006; H04W 52/243; H04W 48/10; H04W 52/34; H04L 1/0025; H04L 1/0026; H04L 5/001; Y02D 30/70; H04B 17/345
  USPC .......................................................... 370/329
  See application file for complete search history.

(56) References Cited

U.S. PATENT DOCUMENTS

| | | | |
|---|---|---|---|
| 2015/0172950 A1* | 6/2015 | Chen ..................... | H04W 24/10 370/252 |
| 2016/0165617 A1* | 6/2016 | Sakamoto ............. | H04W 16/14 370/329 |
| 2016/0192201 A1* | 6/2016 | Wang ................ | H04W 74/0816 455/454 |
| 2016/0227571 A1* | 8/2016 | Baek ..................... | H04W 16/14 |
| 2017/0142746 A1* | 5/2017 | Koorapaty ............ | H04W 16/14 |
| 2017/0164301 A1* | 6/2017 | Jeon .................. | H04W 52/243 |
| 2017/0231013 A1* | 8/2017 | Ahn ................. | H04W 74/0883 |
| 2017/0257879 A1* | 9/2017 | Kang ................ | H04W 74/0816 |
| 2017/0318473 A1* | 11/2017 | Futaki ................... | H04W 16/14 |
| 2018/0007733 A1* | 1/2018 | Mochizuki ........... | H04W 52/02 |
| 2018/0175975 A1* | 6/2018 | Um ...................... | H04L 1/1816 |
| 2018/0220458 A1* | 8/2018 | Ouchi .................... | H04J 11/00 |
| 2018/0234871 A1* | 8/2018 | Ahn ..................... | H04L 5/0048 |

OTHER PUBLICATIONS

3rd Generation Partnership Project; Technical Specification Group Radio Access Network; Study on Licensed-Assisted Access to Unlicensed Spectrum; 3GPP TR 36.889 V13.0.0; Jun. 2015; pp. 1-285; Release 13; 3GPP Organizational Partners.

Kyocera; "RRM Measurements for Carrier Selection"; 3GPP TSG RAN WG1 Meeting #82; R1-154008; Aug. 24-28, 2015; pp. 1-3; Beijing, China.

* cited by examiner

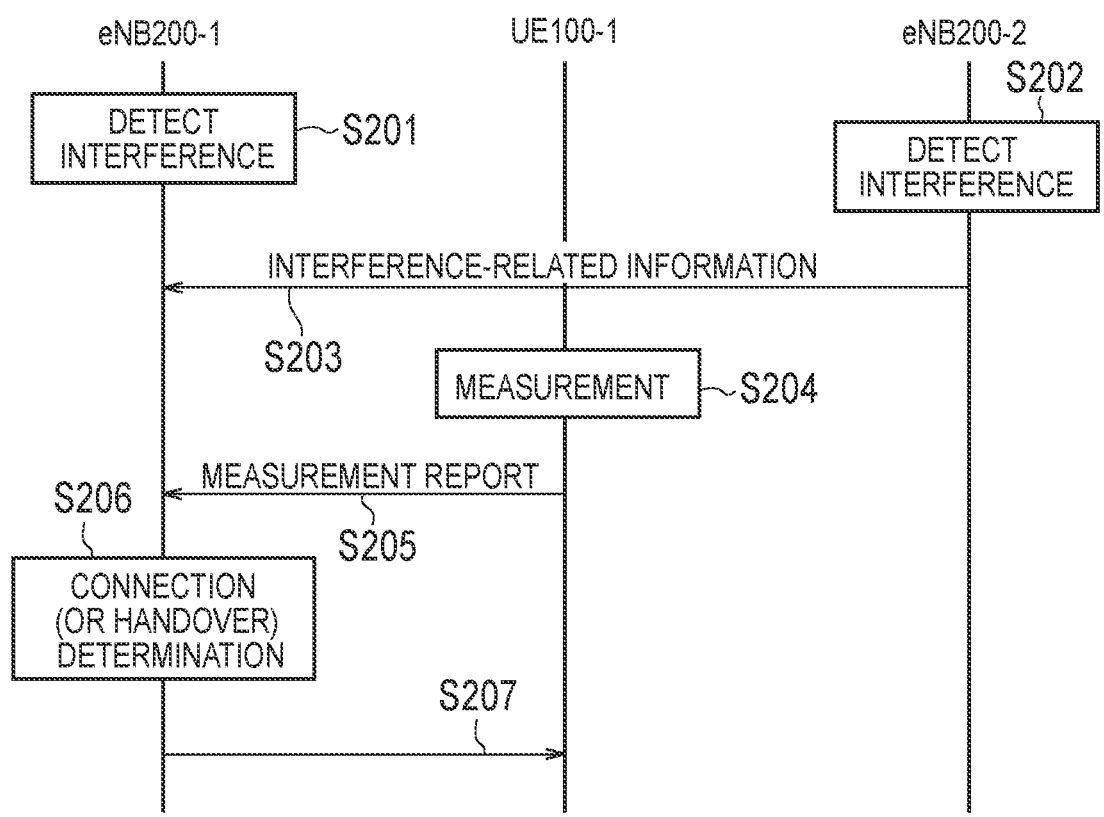

BASE STATION AND RADIO TERMINAL

TECHNICAL FIELD

The present invention relates to a base station and a radio terminal configured to perform radio communication by using a specific frequency band.

BACKGROUND ART

In recent years, to respond to rapidly increasing traffic demands in a mobile communication system, use of a specific frequency band shared by a plurality of operators and/or a plurality of communication systems for radio communication has been discussed. The specific frequency band is, for example, a frequency band not requiring a license (unlicensed band).

To avoid interference with another operator and/or another communication system, a base station and a radio terminal configured to perform radio communication by using such a specific frequency band are requested to perform a clear channel determination process referred to as listen-before-talk (LBT).

The LBT is a procedure in which it is determined, based on received signal strength (interference power), whether or not a target channel in a specific frequency band is available, and only if the target channel is determined to be a clear channel, the target channel is used.

PRIOR ART DOCUMENT

Non-Patent Document

Non Patent Document 1: 3GPP technical report "TR 36.889 V13.0.0" July, 2015

SUMMARY

A base station according to one embodiment uses a specific frequency band shared by a plurality of operators and/or a plurality of communication systems. The base station comprises: a controller configured to transmit, to a radio terminal and/or another base station, interference-related information relating to interference detected by the base station in the specific frequency band.

A radio terminal according to one embodiment comprises a controller configured to receive, from a base station, interference-related information relating to interference detected by the base station using a specific frequency band shared by a plurality of operators and/or a plurality of communication systems.

A base station according to one embodiment uses a specific frequency band shared by a plurality of operators and/or a plurality of communication systems. The base station comprises: a controller configured to receive, from another base station, interference-related information relating to interference detected by the other base station using the specific frequency band.

BRIEF DESCRIPTION OF THE DRAWINGS

FIG. 9 is a diagram illustrating an example of an operation sequence according to the second embodiment.

DESCRIPTION OF THE EMBODIMENT

Overview of Embodiments

Figure 1:
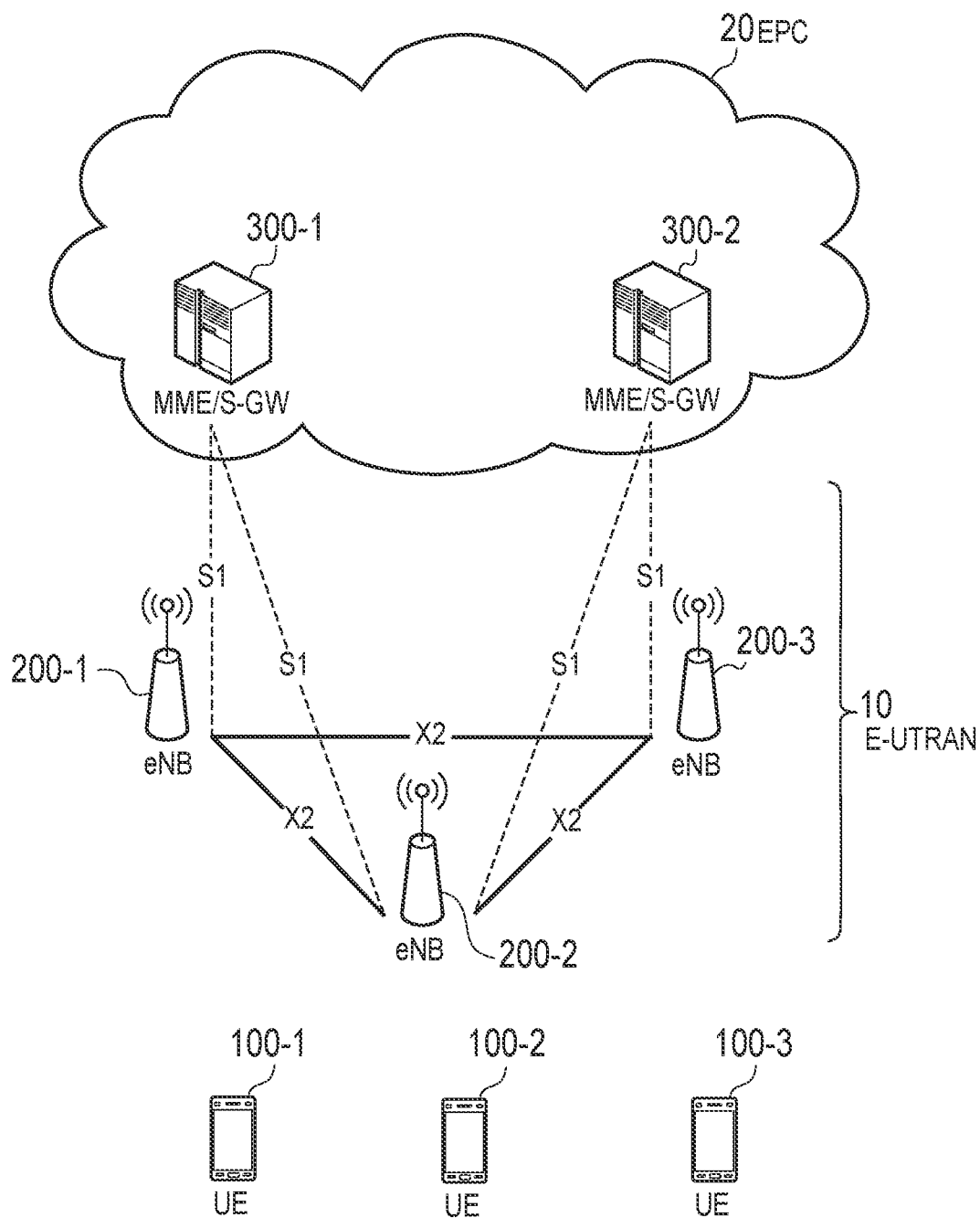
FIG. 1 is a diagram illustrating a configuration of an LTE system.

A base station according to first and second embodiments uses a specific frequency band shared by a plurality of operators and/or a plurality of communication systems. The base station comprises a controller configured to transmit, to a radio terminal and/or another base station, interference-related information relating to interference detected by the base station in the specific frequency band.

In the first and second embodiments, the interference includes at least one of interference from an apparatus managed by a second operator different from a first operator managing the base station, and interference from an apparatus using a second communication system different from a first communication system used by the base station.

In the first and second embodiments, the interference-related information includes at least one of information indicating an interference level measured by the base station, and information indicating a result of a clear channel determination performed by the base station with respect to the specific frequency band.

In the first embodiment, the controller is configured to broadcast the interference-related information.

A radio terminal according to the first embodiment and a modification of the second embodiment comprises a controller configured to receive, from a base station, interference-related information relating to interference detected by the base station using a specific frequency band shared by a plurality of operators and/or a plurality of communication systems.

In the first embodiment, when the radio terminal is in an idle mode, the controller is configured to receive the interference-related information broadcast by the base station, and determine whether or not to select the base station as a connection target of the radio terminal, based on the interference-related information.

In the first embodiment, the controller is configured to receive the interference-related information broadcast from each of a plurality of base stations using the specific frequency band, and select a base station being a connection target of the radio terminal from among the plurality of base stations, based on the interference-related information of each of the plurality of base stations.

In the modification of the second embodiment, the controller is configured to transmit, to another base station, the interference-related information received from the base station.

A base station according to the second base station uses a specific frequency band shared by a plurality of operators and/or a plurality of communication systems. The base station comprises a controller configured to receive, from another base station, interference-related information relating to interference detected by the other base station using the specific frequency band.

In the second embodiment, the controller is configured to perform a determination of whether or not to select the other base station as a new connection target of a radio terminal connected to the base station, based on the interference-related information.

In the second embodiment, the controller is configured to perform the determination further based on information relating to interference detected by the base station.

[Mobile Communication System]

Hereinafter, an LTE system which is the mobile communication system according to the embodiments will be described below.

[Configuration of System]

FIG. 1 is a diagram illustrating a configuration of the LTE system. As illustrated in FIG. 1, the LTE system includes a plurality of UEs (User Equipments) 100, E-UTRAN (Evolved-UMTS Terrestrial Radio Access Network) 10, and EPC (Evolved Packet Core) 20.

The UE 100 corresponds to a radio terminal. The UE 100 is a mobile communication device and performs radio communication with eNB 200. Configuration of the UE 100 will be described later.

The E-UTRAN 10 corresponds to a radio access network. The E-UTRAN 10 includes a plurality of eNBs (evolved Node-Bs) 200. The eNB 200 corresponds to a base station. The eNBs 200 are connected mutually via an X2 interface. Configuration of the eNB 200 will be described later.

The eNB 200 manages one or a plurality of cells and performs radio communication with the UE 100 which is connected to the cell of the eNB 200. The eNB 200 has a radio resource management (RRM) function, a routing function for user data (hereinafter simply referred as "data"), and a measurement control function for mobility control and scheduling, and the like. It is noted that the "cell" is used as a term indicating a minimum unit of a radio communication area, and is also used as a term indicating a function of performing radio communication with the UE 100.

The EPC 20 corresponds to a core network. The EPC 20 includes a plurality of MME (Mobility Management Entity)/S-GWs (Serving-Gateways) 300. The MME performs various mobility controls and the like for the UE 100. The S-GW performs control to transfer data. MME/S-GW 300 is connected to eNB 200 via an S1 interface. The E-UTRAN 10 and the EPC 20 constitute a network.

Figure 2:
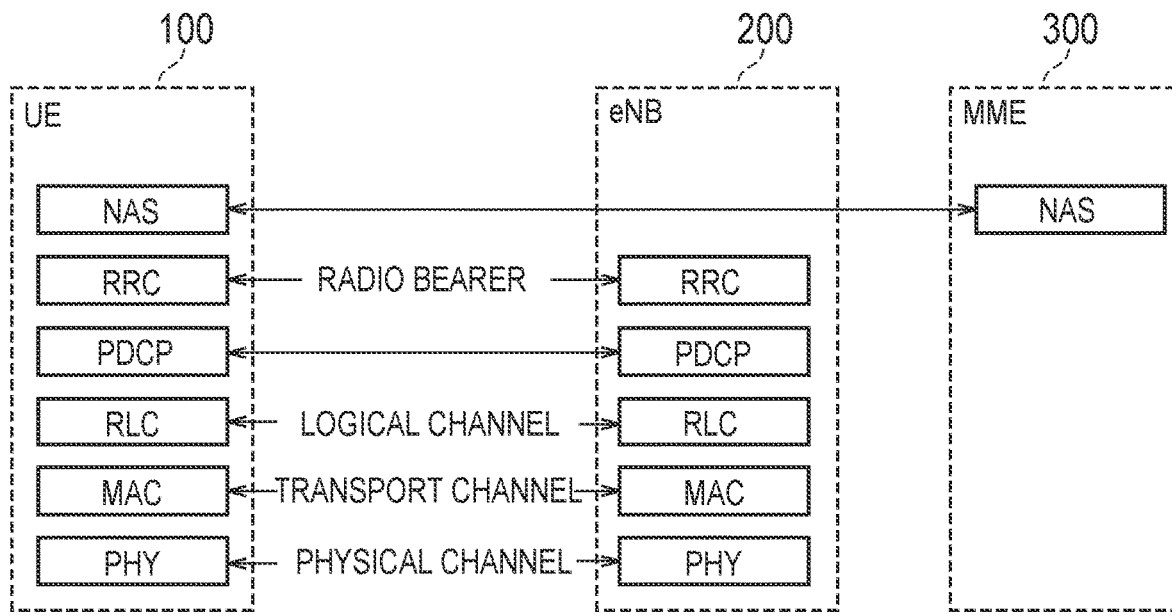
FIG. 2 is a protocol stack diagram of a radio interface in the LTE system.

FIG. 2 is a protocol stack diagram of a radio interface in the LTE system. As illustrated in FIG. 2, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data and control signal are transmitted via the physical channel.

The MAC layer performs priority control of data, a retransmission process by hybrid ARQ (HARQ), and a random access procedure and the like. Between the MAC layer of the UE 100 and the MAC layer of the eNB 200, data and control signal are transmitted via a transport channel. The MAC layer of the eNB 200 includes a scheduler that determines a transport format of an uplink and a downlink (a transport block size and a modulation and coding scheme (MCS)) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, data and control signal are transmitted via a logical channel.

The PDCP layer performs header compression and decompression, and encryption and decryption.

The RRC layer is defined only in a control plane dealing with control signal. Between the RRC layer of the UE 100 and the RRC layer of the eNB 200, message (RRC messages) for various types of configuration are transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in an RRC connected state, otherwise the UE 100 is in an RRC idle state.

A NAS (Non-Access Stratum) layer positioned above the RRC layer performs a session management, a mobility management and the like.

Figure 3:
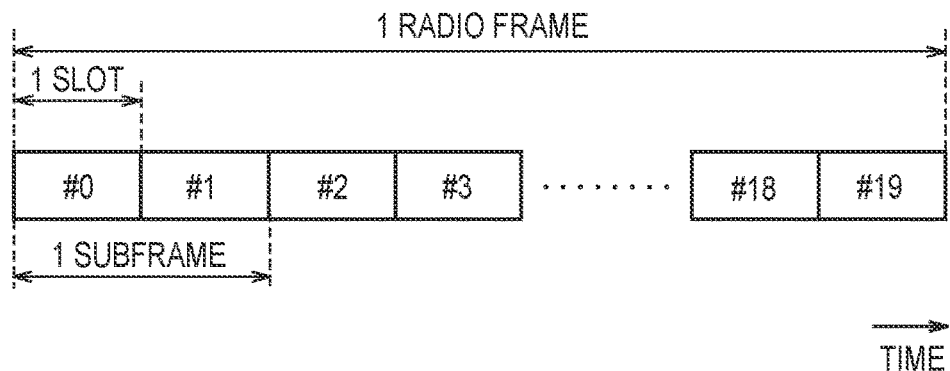
FIG. 3 is a configuration diagram of a radio frame used in the LTE system.

FIG. 3 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 3, a radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction (not shown), and a plurality of symbols in the time direction. Each resource block includes a plurality of subcarriers in the frequency direction. One symbol and one subcarrier forms one resource element. Of the radio resources (time and frequency resources) assigned to the UE 100, a frequency resource can be identified by a resource block and a time resource can be identified by a subframe (or a slot).

In the downlink, a section of several symbols at the head of each subframe is a control region used as a physical downlink control channel (PDCCH) for mainly transmitting a control signal. The details of the PDCCH will be described later. Furthermore, the other portion of each subframe is a region available as a physical downlink shared channel (PDSCH) for mainly transmitting downlink data. In each subframe, reference signals are distributed dispersed in time direction and frequency direction.

In the uplink, both ends in the frequency direction of each subframe are control regions used as a physical uplink control channel (PUCCH) for mainly transmitting an uplink control signal. Furthermore, the other portion of each subframe is a region available as a physical uplink shared channel (PUSCH) for mainly transmitting uplink data.

(Specific Frequency Band)

A specific frequency band will be described, below.

In the current LTE system, the UE 100 and the eNB 200 typically perform radio communication by using a frequency band occupied by one operator and one communication system (assigned band).

Meanwhile, in the embodiment, the UE 100 and the eNB 200 perform radio communication by using a specific frequency band. The specific frequency band is a frequency band not requiring a license (unlicensed band). Alternatively, the specific frequency band may be a frequency band requiring a license (licensed band) and be a frequency band shared by a plurality of operators and/or a plurality of communication systems. An example in which the specific frequency band is an unlicensed band will be described, below.

To avoid interference with another operator and/or another communication system (for example, WLAN system), a UE 100 and an eNB 200 configured to perform radio communication by using such an unlicensed band are requested to perform a clear channel determination process referred to as LBT. The LBT is a procedure in which it is determined, based on received signal strength (interference power), whether or not a target channel in an unlicensed band is available, and only if the target channel is determined to be a clear channel, the target channel is used.

There are two schemes of the LBT, an FBE (Frame Based Equipment) scheme and an LBE (Load Based Equipment) scheme. The FBE scheme is a scheme in which a timing is fixed. Meanwhile, the timing is not fixed in the LBE scheme.

Figure 4:
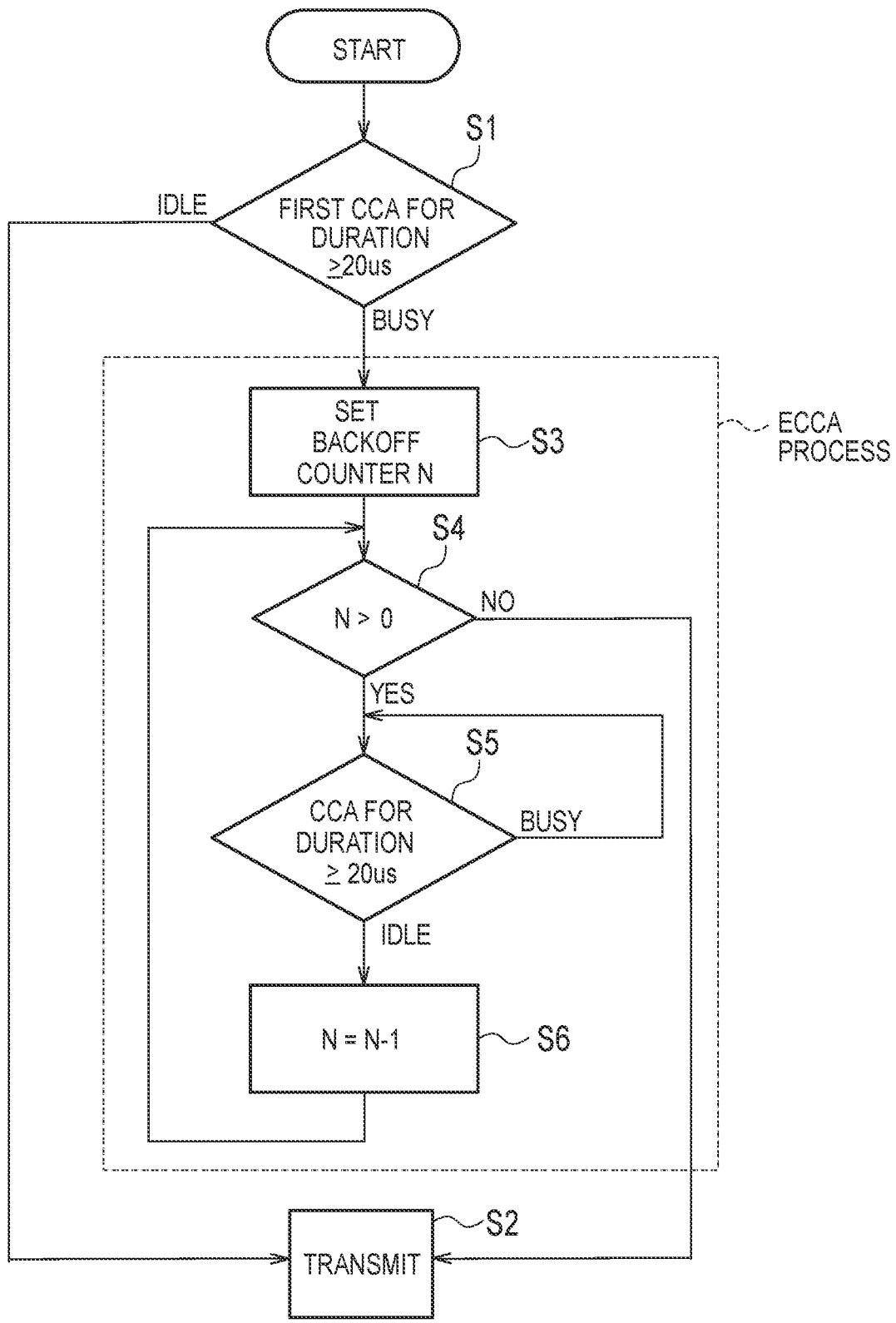
FIG. 4 is a flow chart illustrating an example of LBT of an LBE scheme.

FIG. 4 is a flow chart illustrating an example of the LBT of the LBE scheme. The UE 100 and the eNB 200 execute the present flow for a target channel in an unlicensed band. Here, an example of the eNB 200 executing the present flow will be described.

As illustrated in FIG. 4, the eNB 200 monitors the target channel and determines, based on the received signal strength (interference power), whether or not the target channel is available (step S1). Such determination is referred to as CCA (Clear Channel Assessment). Specifically, if a state where the detected power is larger than a threshold value continues for a constant period (for example, 20 μs or more), the eNB 200 determines that the target channel is in use (Busy). Otherwise, the eNB 200 determines that the target channel is available (Idle), and transmits downlink data to the UE 100 by using the target channel (step S2).

As a result of such an initial CCA, if the target channel is determined to be in use (Busy), the eNB 200 moves to an ECCA (Extended Clear Channel Assessment) process. In the ECCA process, the eNB 200 sets a counter (N) where an initial value is N (step S3). N is a random number from 4 to 32. The UE 100 decrements N (that is, subtracts 1) each time the CCA succeeds (steps S5 and S6). Upon N reaching 0 (step S4: No), the eNB 200 determines that the target channel is available (Idle) and transmits a radio signal by using the target channel (step S2).

(Radio Terminal)

Figure 5:
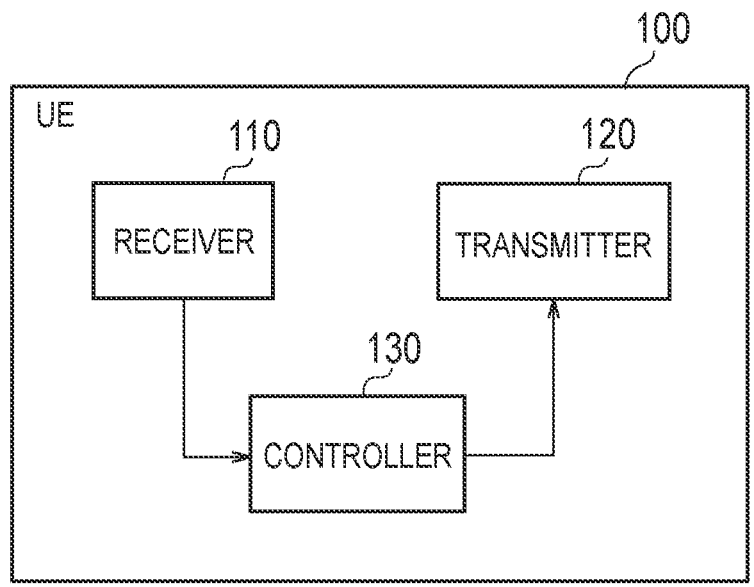
FIG. 5 is a block diagram of a UE (radio terminal).

A configuration of the UE 100 (radio terminal) will be described, below. FIG. 5 is a block diagram of the UE 100. As illustrated in FIG. 5, the UE 100 includes: a receiver 110, a transmitter 120, and a controller 130.

The receiver 110 performs various types of receptions under the control of the controller 130. The receiver 110 includes an antenna and a receiver unit. The receiver unit converts a radio signal received by the antenna into a baseband signal (received signal), and outputs the baseband signal to the controller 130. The receiver 110 may include a first receiver unit configured to receive a radio signal in the assigned band, and a second receiver unit configured to receive a radio signal in the unlicensed band.

The transmitter 120 performs various types of transmissions under the control of the controller 130. The transmitter 120 includes an antenna and a transmitter unit. The transmitter unit converts a baseband signal (transmitted signal) output from the controller 130 into a radio signal, and transmits the radio signal from the antenna. The transmitter 120 may include a first transmitter unit configured to transmit a radio signal in the assigned band, and a second transmitter unit configured to transmit a radio signal in the unlicensed band.

The controller 130 performs various types of controls in the UE 100. The controller 130 includes a processor and a memory. The memory stores a program executed by the processor, and information used for a process by the processor. The processor includes a baseband processor configured to perform modulation and demodulation, coding and decoding, and the like on a baseband signal, and a CPU (Central Processing Unit) configured to execute the program stored in the memory to perform various types of processes. The processor may include a codec that performs coding and decoding on sound and video signals. The processor executes various types of processes described later, and various types of communication protocols described above.

(Base Station)

Figure 6:
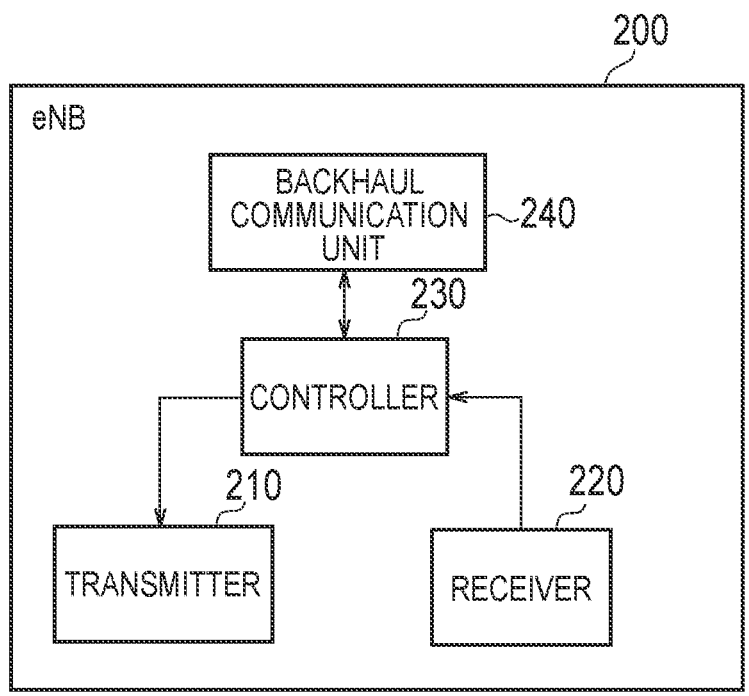
FIG. 6 is a block diagram of an eNB (base station).

A configuration of the eNB 200 (base station) will be described, below. FIG. 6 is a block diagram of the eNB 200. As illustrated in FIG. 6, the eNB 200 includes: a transmitter 210, a receiver 220, a controller 230, and a backhaul communication unit 240.

The transmitter 210 performs various types of transmissions under the control of the controller 230. The transmitter 210 includes an antenna and a transmitter unit. The transmitter unit converts a baseband signal (transmitted signal) output from the controller 230 into a radio signal, and transmits the radio signal from the antenna. The transmitter 210 may include a first transmitter unit configured to transmit a radio signal in the assigned band, and a second transmitter unit configured to transmit a radio signal in the unlicensed band.

The receiver 220 performs various types of receptions under the control of the controller 230. The receiver 220 includes an antenna and a receiver unit. The receiver unit converts a radio signal received by the antenna into a baseband signal (received signal), and outputs the baseband signal to the controller 230. The receiver 220 may include a first receiver unit configured to receive a radio signal in the assigned band, and a second receiver unit configured to receive a radio signal in the unlicensed band.

The controller 230 performs various types of controls in the eNB 200. The controller 230 includes a processor and a memory. The memory stores a program executed by the processor, and information used for a process by the processor. The processor includes a baseband processor configured to perform modulation and demodulation, coding and decoding, and the like on a baseband signal, and a CPU (Central Processing Unit) configured to execute the program stored in the memory to perform various types of processes. The processor executes various types of processes described later and various types of communication protocols described above, and.

The backhaul communication unit 240 is connected to a neighbour eNB 200 via the X2 interface and is connected to the MME/S-GW 300 via the S1 interface. The backhaul communication unit 240 is used for communication performed on the X2 interface, communication performed on the S1 interface, and the like.

First Embodiment

A first embodiment will be described, below.

(Operation Environment)

Figure 7:
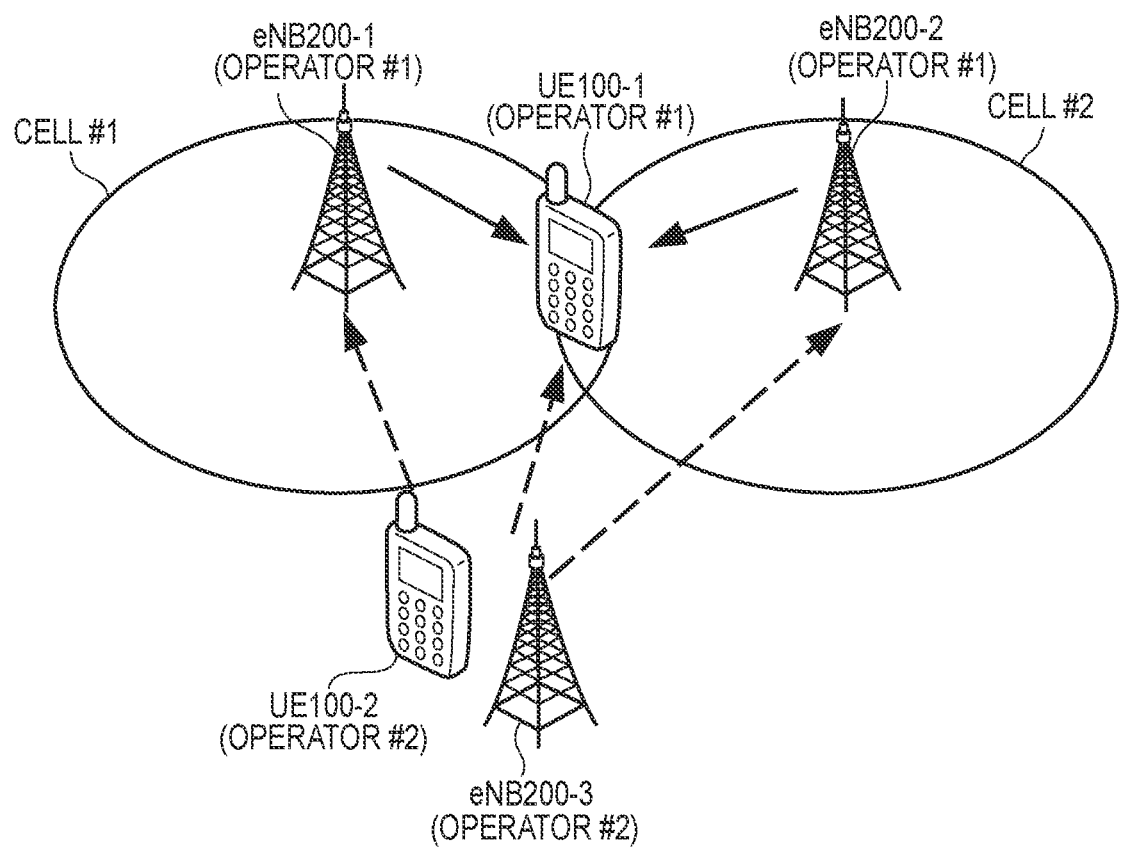
FIG. 7 is a diagram illustrating an operation environment according to a first embodiment and a second embodiment.

FIG. 7 is a diagram illustrating an operation environment according to the first embodiment.

As illustrated in FIG. 7, an eNB 200-1 and an eNB 200-2 of the same operator #1 and an eNB 200-3 of another operator #2 are provided. Each of the eNBs 200 (the eNB 200-1 to the eNB 200-3) is operated in an unlicensed band.

Specifically, each of the eNBs 200 manages a cell of the unlicensed band. FIG. 7 illustrates an example in which the eNB 200-1 manages a cell #1 of the unlicensed band and the eNB 200-2 manages a cell #2 of the unlicensed band. Meanwhile, a UE 100-2 and the eNB 200-3 of the other operator #2 are located in the vicinity of the cell #1 and the cell #2.

It is assumed that between the eNB 200-1 and the eNB 200-2 of the same operator #1, a cell design is achieved by taking into consideration the interference. However, there is a possibility that the eNB 200-1 and the eNB 200-2 of the operator #1 receive strong interference from the UE 100-2 and the eNB 200-3 of the other operator #2.

The UE 100-1 of the operator #1 is located in an overlapping area of the cell #1 and the cell #2. The UE 100-1 is in an idle mode (for example, an RRC idle mode). Along with moving, the UE 100-1 in the idle mode performs an operation of selecting or reselecting, as a serving cell, a suitable cell (target cell) from a plurality of cells. Such an operation is called cell selection or cell reselection. A typical cell selection or cell reselection adopts a concept, called "best cell principle", of selecting a cell with the highest reference signal received power (RSRP) measured by the UE 100. Furthermore, priority is provided for each frequency and a frequency with high priority is preferentially selected. In the first embodiment, it is assumed that the cell #1 and the cell #2 belong to the same unlicensed band (the same frequency) and the cell #1 and the cell #2 have the same priority.

When transitioning from the idle mode to the connected mode, the UE 100-1 performs a connection process (random access process) on the current serving cell. By such a connection process, the UE 100-1 transitions from the idle mode to the connected mode in the current serving cell. In the connected mode, the serving cell may also be called a primary cell (PCell). Hereinafter, an operation of transitioning from the idle mode to the connected mode is referred to as "initial connection".

If the UE 100-1 in the idle mode performs initial connection based on the "best cell principle", the following problems occur. If the eNB 200 is affected by interference from another operator and/or another communication system, the reception quality in the eNB 200 (that is, uplink communication quality) deteriorates. Furthermore, as the LBT is requested for each eNB 200, if the eNB 200 is affected by the interference from the other operator and/or the other communication system, transmission occasions of the eNB 200 are limited. Therefore, if the UE 100-1 performs initial connection to such an eNB 200, reception occasions of the UE 100-1 are also limited.

(Operation According to First Embodiment)

An operation according to the first embodiment will be described, below.

(1) Operation of eNB 200

Operations of the eNB 200-1 and the eNB 200-2 will be described. The eNB 200-1 and the eNB 200-2 perform a similar operation, and thus, only an operation of the eNB 200-1 will be described here.

The eNB 200-1 according to the first embodiment is operated in the unlicensed band. The eNB 200-1 transmits interference-related information relating to interference detected by the eNB 200-1 in the unlicensed band. The interference includes at least one of: interference from the operator #2 different from the operator #1 of the eNB 200-1; and interference from a communication system (for example, WLAN system) different from the communication system of the eNB 200-1 (LTE system).

In the first embodiment, the eNB 200-1 performs a process of transmitting the interference-related information by broadcast to the UE 100. For example, the eNB 200-1 includes the interference-related information into a system information block (SIB). The SIB is a message (System Information message) that can be received by a UE 100 in the idle mode.

In the first embodiment, the interference-related information is information indicating an interference level measured by the eNB 200-1. The information indicating the interference level is, for example, a received signal strength indicator (RSSI). The RSSI may be an RSSI measured by the eNB 200-1 during LBT. The RSSI may be an instantaneous maximum value or an average value.

The eNB 200-1 preferably excludes the interference from the operator of the eNB 200-1 (operator #1) from the RSSIs measured by the eNB 200-1. For example, the eNB 200-1 measures RSRP of another eNB 200 and/or UE 100 of the operator of the eNB 200-1, and calculates, as an interference level from another operator, a value obtained by subtracting RSRP from the RSSI measured by the eNB 200-1. Here, the eNB 200-1 can identify a reference signal used in the operator of the eNB 200-1, and thus, can suitably perform RSRP measurement for the operator of the eNB 200-1. It is noted that RSSI is measured in units of resource blocks, while RSRP is a measured in units of resource elements, and thus, a conversion process to adjust the units is needed.

Moreover, in order to more efficiently measure the interference level from the UE 100 and/or the eNB 200 of another operator, a measurement timing of the RSSI may be improved. For example, by performing the RSSI measurement at a timing when the UE 100 and/or the eNB 200 of the operator of the eNB 200-1 does not perform transmission, the eNB 200-1 can grasp more precisely the interference level from another operator. Furthermore, the eNB 200-1 may set, in the UE 100, a gap for stopping transmission by the UE 100 in the cell of the eNB 200-1, during the RSSI measurement. Such a gap may be regularly provided.

Alternatively, the interference-related information may be information indicating a result of clear channel determination performed by the eNB 200-1 for the unlicensed band. The information indicating the result of clear channel determination is, for example, information indicating probability of successful LBT or probability of successful CCA (success rate information). The information indicating the result of clear channel determination is information indicating probability of failed LBT or probability of failed CCA (busy rate information).

(2) Operation of UE 100-1

Next, an operation of the UE 100-1 will be described. The UE 100-1 according to the first embodiment receives, from the eNB 200-1, interference-related information relating to the interference detected by the eNB 200-1.

In the first embodiment, the UE 100-1 receives, during the idle mode of the UE 100-1, interference-related information transmitted from the eNB 200-1 by broadcast, and determines, based on the interference-related information, whether or not to select the (cell of the) eNB 200-1 as a connection target (serving cell) of the UE 100-1. For example, if the UE 100-1 determines, based on the interference-related information, that the eNB 200-1 receives strong interference and/or that the eNB 200-1 experiences interference with high probability, the UE 100-1 excludes the (cell of the) eNB 200-1 from the connection targets of the UE 100-1.

Furthermore, in the first embodiment, the UE 100-1 receives interference-related information for each of a plurality of eNBs 200 (the eNB 200-1 and the eNB 200-2) of the operator of the UE 100-1, and selects, based on the interference-related information of each eNB 200, a connection target of the UE 100-1 from among the (cells of the) plurality of eNBs 200. For example, the UE 100-1 selects, as a connection target, the eNB 200 with the lowest interference level from among the plurality of eNBs 200. Furthermore, the UE 100-1 may select, as a connection target, the eNB 200 with the lowest probability of receiving interference from among the plurality of eNBs 200.

The UE 100-1 may select a connection target, based not only on the interference-related information of each eNB 200, but also on the RSRP measured by the UE 100-1. Here, an example is described in which the interference-related information is the RSSI measured on the eNB 200. For example, if RSRP of the eNB 200-1 is higher than RSRP of the eNB 200-2, the UE 100-1 does not select the eNB 200-1 as a connection target based only on the RSRP, but selects the connection target by also considering RSSI measured on the eNB 200-1 ($RSSI_A$) and RSSI measured on the eNB 200-2 ($RSSI_B$). As a result, even though the RSRP of the eNB 200-1 is higher than the RSRP of the eNB 200-2, the UE 100-1 can select the eNB 200-2 as a connection target, based on at least one of the $RSSI_A$ and the $RSSI_B$.

For example, if "$RSSI_A$>threshold value" is satisfied, the UE 100-1 assumes that a trouble may occur in LBT in the eNB 200-1, and selects the eNB 200-2 as a connection target. Here, the threshold value may be set by the eNB 200. Furthermore, the threshold value may be included in the SIB (System Information Block) transmitted by the eNB 200. Alternatively, the UE 100-1 compares $RSSI_A$ and $RSSI_B$, and if "$RSSI_A$>$RSSI_B$" is satisfied, the UE 100-1 selects the eNB 200-2 as a connection target. The method using the threshold value and the method of comparing $RSSI_A$ and $RSSI_B$ may be used in combination.

It is noted that, instead of the UE 100-1 performing comparison between the RSSI and the threshold value, the eNB 200 may perform the comparison and the eNB 200 may broadcast a result of the comparison between the RSSI and the threshold value (information indicating whether or not the RSSI exceeds the threshold value).

(3) Operation Sequence

Figure 8:
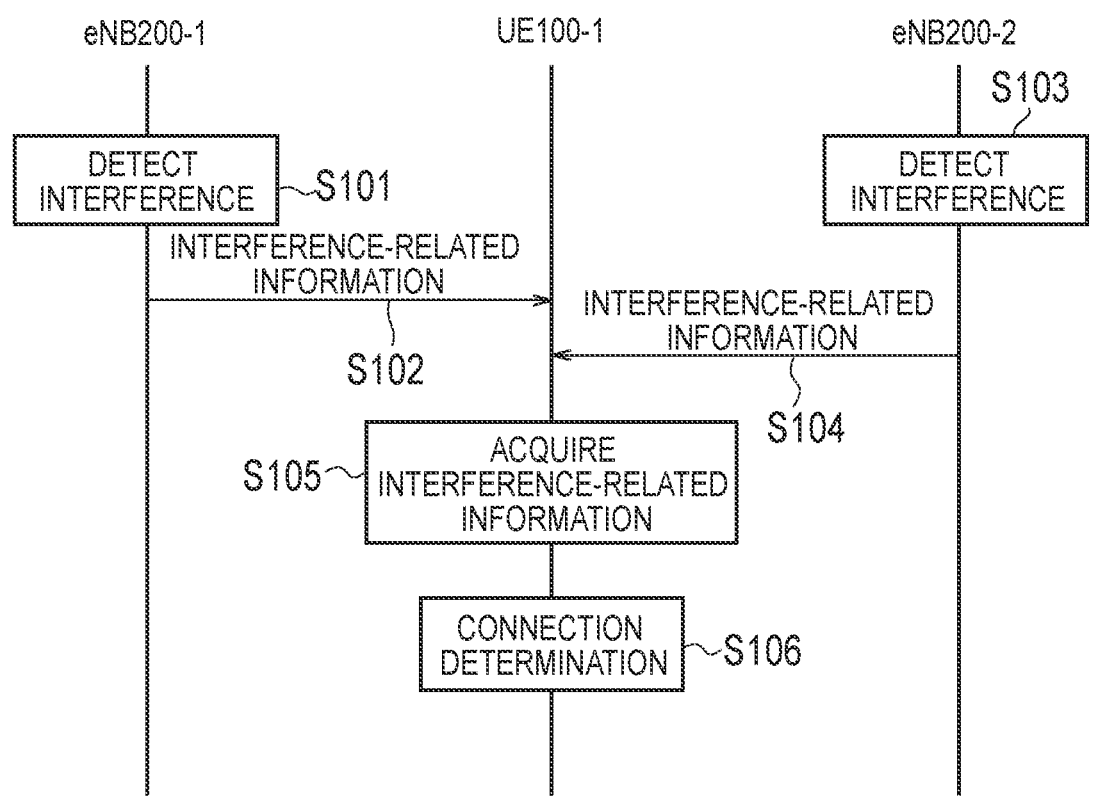
FIG. 8 is a diagram illustrating an example of an operation sequence according to the first embodiment.

FIG. 8 is a diagram illustrating an example of an operation sequence according to the first embodiment.

As illustrated in FIG. 8, the eNB 200-1 detects interference (step S101) and transmits interference-related information by broadcast (step S102).

The eNB 200-2 detects interference (step S103) and transmits interference-related information by broadcast (step S104). It is noted that the eNB 200-2 may transmit the interference-related information to the UE 100 via the eNB 200-1. Specifically, after the eNB 200-2 transmits the interference-related information to the eNB 200-1, the eNB 200-1 may transmit by broadcast the interference-related information received from the eNB 200-2, as information of a neighbouring cell.

The UE 100-1 receives and acquires the interference-related information of each of the eNB 200-1 and the eNB 200-2 (step S105). Then, the UE 100-1 selects a connection target of the UE 100-1 from among the eNB 200-1 and the eNB 200-2, based on the interference-related information of each of the eNB 200-1 and the eNB 200-2 (step S106).

It is noted that each of the eNBs 200 (200-1 and 200-2) may transmit the interference-related information by broadcast only if detecting interference and finding out that the interference is equal to or higher than a predetermined threshold value. In other words, if detecting interference, each of the eNBs 200 may not always need to transmit the interference-related information. In such a case, if receiving interference-related information only from the eNB 200-1, the UE 100-1 determines that no interference occurs in the eNB 200-2 and may preferentially select the eNB 200-2 as a connection target.

Furthermore, if one eNB 200 performs comparison of the interference of a plurality of eNBs 200, the UE 100 receives a comparison result of the interference of the plurality of eNBs 200 transmitted from the one eNB 200, and based on the result, may consider an interference state of each of the eNBs 200 to determine the eNB 200 of the connection target.

Furthermore, if the interference detected by the eNB 200 is equal to or higher than the predetermined threshold value, each of the eNBs 200 may transmit, to the UE 100, by unicast or broadcast, an instruction for suppressing connection to the eNB 200, in addition to or instead of the interference-related information. The UE 100-1 that receives, from the eNB 200, the instruction for suppressing the connection suppresses performance of a procedure for connecting to the eNB 200 (RRC Connection Procedure and the like).

(Summary of First Embodiment)

Each of the eNBs 200 transmits by broadcast interference-related information relating to the interference detected by the eNB 200 in the unlicensed band. In the idle mode, the UE 100-1 receives the interference-related information of at least one of the eNBs 200 and selects a connection target (serving cell) of the UE 100-1 from among the plurality of eNBs 200 (the plurality of cells). Thereby, the UE 100-1 can select a suitable connection target by considering whether or not each of the eNBs 200 receives interference in the unlicensed band.

[Modification of First Embodiment]

To achieve a cell reselection procedure considering the interference detected by the eNB 200, the current cell reselection procedure of the LTE system may be partly changed. The current cell reselection procedure of the LTE system will be described below.

The UE 100 in the idle mode selects a target cell to be used as a serving cell from among a plurality of cells operated at different frequencies. Specifically, if a start condition is satisfied, the UE 100 measures the quality of a neighbouring cell adjacent to the current serving cell, and selects, from among cells that satisfy a selection condition, a target cell to be used as the serving cell.

Firstly, the start conditions are shown as follows:

(A1) A frequency having priority higher than the priority of the frequency of the current serving cell:

the UE 100 always measures the quality of the frequency having higher priority.

(A2) A frequency having priority equal to or lower than the priority of the frequency of the current serving cell:

the UE 100 measures, if the quality of the current serving cell falls below a predetermined threshold value, the quality of the frequency having equal priority or lower priority.

Secondly, the selection conditions are shown as follows:

(B1) The priority of the frequency of the neighbouring cell is higher than the priority of the current serving cell:

the UE 100 selects, as a target cell, a cell that satisfies a relationship of $Squal > Thresh_{X, HighQ}$ over a predetermined period ($Treselection_{RAT}$), or a cell that satisfies a relationship of $Srxlev > Thresh_{X, HighP}$ over the predetermined period ($Treselection_{RAT}$). In such a case, such criteria to be satisfied by the neighbouring cell is sometimes referred to as "S-criteria".

It is noted that Squal represents a cell selection quality level, and is calculated by Squal=$Q_{qualmeas}-(Q_{qualmin}+Q_{qualminoffset})-\text{Qoffset}_{temp}$. $Q_{qualmeas}$ is a quality level (RSRQ) of the neighbouring cell, $Q_{qualmin}$ is a minimum required quality level, $Q_{qualminoffset}$ is a predetermined offset steadily applied to the neighbouring cell, and $\text{Qoffset}_{temp}$ is an offset temporarily applied to the neighbouring cell. $\text{Thresh}_{X, HighQ}$ is a predetermined threshold value.

Furthermore, Srxlev represents a cell selection received power, and is calculated by Srxlev=$Q_{rxlevmeas}-(Q_{rxlevmin}+Q_{rxlevminoffset})-\text{Pcompensation}-\text{Qoffset}_{temp}$. $Q_{rxlevmeas}$ is a received power (RSRP) of the neighbouring cell, $Q_{rxlevmin}$ is a minimum required received power, $Q_{rxlevminoffset}$ is a predetermined offset steadily applied to the neighbouring cell, Pcompensation is a parameter related to uplink capability, and $\text{Qoffset}_{temp}$ is an offset temporarily applied to the neighbouring cell. $\text{Thresh}_{X, HighP}$ is a predetermined threshold value.

(B2) The priority of the frequency of the neighbouring cell is identical to the priority of the current serving cell:

The UE 100 calculates a ranking $R_s$ of the current serving cell and a ranking $R_n$ of the neighbouring cell, and selects, as a target cell, a cell having the ranking $R_n$ higher than $R_s$ over a predetermined period ($\text{Treselection}_{RAT}$). In such a case, such criteria to be satisfied by the neighbouring cell is sometimes referred to as "R-criteria".

It is noted that $R_s$ is calculated by $R_s=Q_{meas,s}+Q_{Hyst}-\text{Qoffset}_{temp}$. $R_n$ is calculated by $R_n=Q_{meas,n}-\text{Qoffset}-\text{Qoffset}_{temp}$. $Q_{meas,s}$ is the received power (RSRP) of the current serving cell, and $Q_{meas,n}$ is the received power (RSRP) of the neighbouring cell. $Q_{Hyst}$ is a hysteresis value for achieving preferential reselection of the current serving cell as the target cell. $\text{Qoffset}_{temp}$ is an offset temporarily applied to the current serving cell and the neighbouring cell.

(B3) The priority of the frequency of the neighbouring cell is lower than the priority of the current serving cell:

The UE 100 selects, under a premise that $\text{Squal}<\text{Thresh}_{Serving, LowQ}$ is satisfied over the predetermined period ($\text{Treselection}_{RAT}$), or $\text{Srxlev}<\text{Thresh}_{Serving, LowP}$ is satisfied over the predetermined period ($\text{Treselection}_{RAT}$), a target cell from among neighbouring cells by a method similar to the above-described (B1).

It is noted that $\text{Thresh}_{Serving, LowQ}$ and $\text{Thresh}_{Serving, LowP}$ are predetermined threshold values similarly to $\text{Thresh}_{X, HighQ}$ and $\text{Thresh}_{X, HighP}$.

It is noted that various types of parameters used for selecting a target cell are included in the System Information Block (SIB) broadcast from the eNB 200. The various types of parameters include the priority of the frequency (cellReselectionPriority), the predetermined period ($\text{Treselection}_{RAT}$), various types of offsets ($Q_{qualminoffset}$, $Q_{rxlevminoffset}$, $\text{Qoffset}_{temp}$, $Q_{Hyst}$, Qoffset), and various types of threshold values ($\text{Thresh}_{X, HighQ}$, $\text{Thresh}_{X, HighP}$, $\text{Thresh}_{Serving, LowQ}$, $\text{Thresh}_{Serving, LowP}$).

In such a cell reselection procedure, a new parameter based on the interference detected by the eNB 200 is introduced as the interference-related information and the eNB 200 broadcasts the new parameter, thereby a cell reselection reflecting the interference state in each of the eNBs 200 (each cell) becomes possible. Examples of the new parameter include: priority of the frequency based on the interference detected by the eNB 200; various types of offsets based on the interference detected by the eNB 200; various types of threshold values based on the interference detected by the eNB 200; and the like.

Second Embodiment

A second embodiment will be described while focusing on differences from the first embodiment, below.

The first embodiment is an embodiment relating to the UE 100 in the idle mode, while the second embodiment is an embodiment relating to the UE 100 in the connected mode. Furthermore, in an operation environment such as illustrated in FIG. 7, it is assumed that the UE 100-1 is in a state of being connected to the eNB 200-1 (connected mode).

The eNB 200-2 according to the second embodiment transmits, to the eNB 200-1, interference-related information relating to the interference detected by the eNB 200-2 in the unlicensed band. Specific examples of the interference-related information are similar to that in the first embodiment.

The eNB 200-1 according to the second embodiment receives the interference-related information from the eNB 200-2. Based on the interference-related information received from the eNB 200-2, the eNB 200-1 determines whether or not to select the eNB 200-2 as a new connection target of the UE 100-1 connected to the eNB 200-1.

The new connection target of the UE 100-1 is a handover destination of the UE 100-1. Alternatively, the new connection target of the UE 100-1 may be a secondary eNB (SeNB) of the UE 100-1 in Dual connectivity scheme. The Dual connectivity scheme is a scheme in which the UE 100 connects to two eNBs 200. In a case of Dual connectivity scheme, the eNB 200-1 may function as a master eNB (MeNB) of the UE 100-1.

If determining, based on the interference-related information received from the eNB 200-2, that the eNB 200-2 receives strong interference or that the eNB 200-2 receives interference with high probability, the eNB 200-1 may exclude the eNB 200-2 from the connection targets of the UE 100-1. Alternatively, the eNB 200-1 may receive interference-related information from a plurality of eNBs 200 including the eNB 200-2, and may select, from among the plurality of eNBs 200, the eNB 200 with lowest interference level or the eNB 200 with the lowest probability of receiving interference, as a new connection target of the UE 100-1.

The eNB 200-1 may select a new connection target of the UE 100-1, based not only on interference-related information received from another eNB 200, but also on information relating to the interference detected by the eNB 200-1. Alternatively, the eNB 200-1 may determine (select) a new connection target of the UE 100-1, based the information relating to the interference detected by the eNB 200-1, not based on the interference-related information received from the other eNB 200.

FIG. 9 is a diagram illustrating an example of an operation sequence according to the second embodiment.

As illustrated in FIG. 9, the eNB 200-1 detects interference (step S201), and measures and stores information relating to the detected interference (for example, RSSI).

Furthermore, the eNB 200-2 detects interference (step S202) and transmits interference-related information (for example, RSSI) to the eNB 200-1 (step S203). The eNB 200-2 may regularly transmit the interference-related information to the eNB 200-1, or may transmit the interference-related information to the eNB 200-1 in response to a request from the eNB 200-1. It is noted that the eNB 200-1 may request, to the eNB 200-2, transmission of the interference-related information, in response to reception of a measurement report from the UE 100-1 (step S205).

The UE 100-1 measures RSRP of the eNB 200-1 ($\text{RSRP}_A$) and RSRP of the eNB 200-2 ($\text{RSRP}_B$) (step S204) and transmits a measurement report including a measurement result to the eNB 200-1 (step S205).

The eNB 200-1 receives the measurement report and determines whether or not to select the eNB 200-2 as the new connection target of the UE 100-1 (step S206). For example, if $RSRP_B$ included in the measurement report is higher than $RSRP_A$, the eNB 200-1 does not select the eNB 200-2 as the new connection target of the UE 100-1 only based on the RSRP, but determines the new connection target of the UE 100-1 by considering also the RSSI measured in the eNB 200-1 ($RSSI_A$) and the RSSI measured in the eNB 200-2 ($RSSI_B$). For example, if "$RSSI_B$>threshold value" is satisfied, the eNB 200-1 assumes that a trouble may occur in LBT in the eNB 200-2, and does not select the eNB 200-2 as the new connection target of the UE 100-1. Alternatively, the eNB 200-1 compares $RSSI_A$ and $RSSI_B$, and if "$RSSI_B$<$RSSI_A$" is satisfied, the eNB 200-1 selects the eNB 200-2 as the new connection target of the UE 100-1. The method using the threshold value and the method of comparing $RSSI_A$ and $RSSI_B$ may be used in combination. Here, description proceeds under the assumption that the eNB 200-1 selects the eNB 200-2 as the new connection target of the UE 100-1.

The eNB 200-1 transmits, to the UE 100-1, information for causing the UE 100-1 to connect to the eNB 200-2 (step S207). The information is a handover instruction for the eNB 200-2. Alternatively, the information may be an addition instruction for adding the eNB 200-2 as an SeNB. The UE 100-1 connects to the eNB 200-2, based on the information received from the eNB 200-1.

It is noted that in the present sequence, an example is shown in which the eNB 200-1 that is the connection target of the UE 100-1 performs the determination. However, it also may be possible that the eNB 200-1 transmits a handover request (including interference information of the eNB 200-1) and the eNB 200-2 that receives the request determines whether or not to allow the handover request, based on interference information of the eNB 200-2 and the interference information of the eNB 200-1. It is noted that the interference information of the eNB 200-1 may not be included in the handover request, and in that case, the eNB 200-2 may determine whether or not to allow the handover request, based on interference information of the eNB 200-2. If allowing the handover request, the eNB 200-2 transmits an approval response to the eNB 200-1. On the other hand, if rejecting the handover request, the eNB 200-2 transmits a rejection response to the eNB 200-1. In a case of Dual connectivity scheme, the handover request may be interpreted as an SeNB addition request.

(Summary of Second Embodiment)

The eNB 200-1 according to the second embodiment receives interference-related information from another eNB 200. Based on the interference-related information received from the other eNB 200, the eNB 200-1 selects a new connection target of the UE 100-1 connected to the eNB 200-1. Thereby, the eNB 200-1 can suitably select the new connection target of the UE 100-1 by considering whether the other eNB 200 receives interference in the unlicensed band.

[Modification of Second Embodiment]

The sequence illustrated in FIG. 9 may be modified as follows. In the present modification, the eNB 200-2 broadcasts the interference-related information in the cell of the eNB 200-2, instead of transmitting the interference-related information to the eNB 200-1 (step S203).

The UE 100-1 receives the interference-related information (SIB) from the eNB 200-2 and transmits a measurement report including the received interference-related information to the eNB 200-1 (step S205). That is, the UE 100-1 reports the interference-related information received from the eNB 200-2 to the eNB 200-1. Afterwards, the eNB 200-1 performs the process of step S206, based on the measurement report received from the UE 100-1.

According to the modification of the second embodiment, the eNB 200-1 can determine a suitable connection target of the UE 100-1, even if the interference-related information is not transmitted and received between the eNB 200-1 and the eNB 200-2.

It is noted that the eNB 200-1 may perform setting for the UE 100-1 so that the UE 100-1 includes interference-related information of another cell into the measurement report. Such setting may be performed by broadcast signaling or may be performed by dedicated signaling addressed to the UE 100-1 (for example, measurement config.). Based on setting information received from the eNB 200-1, the UE 100-1 includes the interference-related information received from the eNB 200-2 into the measurement report.

OTHER EMBODIMENTS

Each of the eNBs 200 operated in the unlicensed band may adjust, based on the interference state detected by the eNB 200, the number of UEs 100 accommodated by the eNB 200, for example by extending or narrowing a coverage of the eNB 200. Here, the "coverage" is not limited to a physical coverage, but may also be a logical coverage. The physical coverage can be extended or narrowed by increasing or decreasing transmission power of the eNB 200. The logical coverage can be extended or narrowed by adjusting a handover parameter (handover threshold value) of the eNB 200. For example, the eNB 200 receiving strong interference narrows its own coverage. Alternatively, if the eNB 200-1 receives stronger and bigger interference compared to the eNB 200-2, the coverage of the eNB 200-1 is narrowed, while the coverage of the eNB 200-2 is be extended.

The first and second embodiments may be performed separately and independently, and may also be performed through a combination thereof. In addition to transmitting interference-related information to another eNB, each of the eNBs 200 may broadcast the interference-related information to the UE 100.

Furthermore, while in the idle mode and if receiving interference-related information from the eNB 200-1, the UE 100 may operate as to perform a reselection (cell reselection) to another eNB 200-2, based on the interference-related information. It is noted that the reselection may mean changing a cell (base station) to camp on.

Furthermore, if detecting interference from the eNB 200-3 or the UE 100-2, the eNB 200-1 may transmit, to the eNB 200-3 or the UE 100-2 that is the source of the interference, an instruction (a request) indicating to suppress the interference (to reduce transmission power). Furthermore, the eNB 200-1 may receive, from a connected UE 100-1, an identification number being an address of the eNB 200-3 or the UE 100-2.

In the above-described embodiment, the interference-related information may be at least one of an uplink error rate and a downlink error rate. Furthermore, the interference-related information may be one type of priority determination parameter calculated based on at least the interference information.

In the above-described embodiment, the LTE system is exemplified as the mobile communication system. However, the present invention is not limited to the LTE system. The present invention may be applied to systems other than the LTE system.

The entire content of Japanese Patent Application No. 2015-159044 (filed on Aug. 11, 2015) is incorporated in the present specification by reference.

INDUSTRIAL APPLICABILITY

The present invention is useful in the field of radio communication.

The invention claimed is:

1. A radio terminal, comprising:
a controller configured to
when the radio terminal is in an idle mode, receive interference-related information broadcast from a base station using a specific frequency band shared by a plurality of operators, communication systems or both, the interference-related information including at least one of
information indicating an interference level measured by the base station in the specific frequency band, and
information indicating a result of a determination by the base station whether a specific channel of the specific frequency band is available,
determine whether the base station receives interference having a strength above a threshold based on the interference-related information; and
determine whether or not to select the base station as a connection target of the radio terminal, based on the determination based on the interference-related information, wherein
the interference includes interference from an apparatus using a second communication system different from a first communication system of the base station, and wherein
the interference-related information includes a received signal strength indicator (RSSI).

2. The radio terminal according to claim 1, wherein the controller is configured to
receive the interference-related information broadcast from each of a plurality of base stations using the specific frequency band, and
select the base station being the connection target of the radio terminal from among the plurality of base stations, based on the interference-related information of each of the plurality of base stations.

3. The radio terminal according to claim 1, wherein the controller is configured to transmit, to another base station, the interference-related information received from the base station.

4. A base station configured to use a specific frequency band shared by a plurality of operators, communication systems or both, the base station comprising:
a controller configured to
receive, from other base station, interference-related information including at least one of
information indicating an interference level measured by the other base station in the specific frequency band, and
information indicating a result of a determination by the other base station whether a specific channel of the specific frequency band is available,
determine whether the other base station receives interference having a strength above a threshold based on the interference-related information; and
determine whether or not to select the other base station as a new connection target of a radio terminal connected to the base station, based on the determination based on the interference-related information, the new connection target of the radio terminal being a handover destination of the radio terminal, wherein
the interference includes interference from an apparatus using a second communication system different from a first communication system used by the base station, and
the interference-related information includes a received signal strength indicator (RSSI).

5. The base station according to claim 4, wherein the controller is configured to perform the determination further based on information relating to interference detected by the base station.

6. The radio terminal according to claim 1, wherein the RSSI is information excluding interference from the same operator as the base station that broadcasts the interference-related information.

7. The radio terminal according to claim 1, wherein the RSSI is measured at a timing when radio terminals and/or base stations of the same operator as the base station that broadcasts the interference-related information, are not transmitting.

* * * * *